US012435447B2

(12) United States Patent
Gao et al.

(10) Patent No.: US 12,435,447 B2
(45) Date of Patent: Oct. 7, 2025

(54) AEROGEL FIBER HAVING SPECIFIC CROSS-SECTIONAL MORPHOLOGICAL FEATURE, GRAPHENE FIBER AND PREPARATION METHOD AND DEVICE THEREFOR

(71) Applicant: ZHEJIANG UNIVERSITY, Zhejiang (CN)

(72) Inventors: Chao Gao, Zhejiang (CN); Peng Li, Zhejiang (CN); Yingjun Liu, Zhejiang (CN); Zhen Xu, Zhejiang (CN); Ziqiu Wang, Zhejiang (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/434,741

(22) Filed: Feb. 6, 2024

(65) Prior Publication Data

US 2024/0175169 A1 May 30, 2024

Related U.S. Application Data

(63) Continuation of application No. PCT/CN2021/137642, filed on Dec. 14, 2021.

(51) Int. Cl.
*D01D 5/06* (2006.01)
*D01D 10/02* (2006.01)
(Continued)

(52) U.S. Cl.
CPC ............... *D01D 5/06* (2013.01); *D01D 10/02* (2013.01); *D01D 10/06* (2013.01); *D01F 9/12* (2013.01);
(Continued)

(58) Field of Classification Search
None
See application file for complete search history.

(56) References Cited

U.S. PATENT DOCUMENTS

2014/0308449 A1   10/2014  Zhamu et al.
2020/0361126 A1*  11/2020  Ren .................... B29C 41/38

FOREIGN PATENT DOCUMENTS

CN    101049991 A    10/2007
CN    103726133 A     4/2014
(Continued)

OTHER PUBLICATIONS

International Search Report Dated Jul. 29, 2022 for corresponding PCT Application No. PCT/CN2021/137642 along its English Translation.
(Continued)

*Primary Examiner* — Lynda Salvatore

(57) ABSTRACT

An aerogel fiber having specific cross-sectional morphological feature, graphene fiber and a preparation method and device therefor are provided. The arrangement of the cross-sectional two-dimensional nanosheets of the aerogel fiber can be regulated. The regulation method includes: adding a rotating flow field device during wet spinning before the spinning fluid is sprayed out, the rotating flow field causes the two-dimensional nanosheets to form a specific sheet-like arrangement in the cross-sectional direction of the gel fiber under the action of rotating shear, and preparing a graphene oxide aerogel fiber with specific morphological structure (concentric or spiral) from the gel fiber having specific cross-sectional morphological structure under freeze-drying conditions. Further, drying and densifying, stretching and reducing the hydrogel fiber with the concentric circle structure are performed to obtain a graphene fiber with high modulus and high thermal conductivity.

14 Claims, 3 Drawing Sheets

(51) Int. Cl.
*D01D 10/06* (2006.01)
*D01F 9/12* (2006.01)

(52) U.S. Cl.
CPC ...... *D10B 2101/12* (2013.01); *D10B 2401/08* (2013.01); *D10B 2401/16* (2013.01)

(56) References Cited

FOREIGN PATENT DOCUMENTS

| | | | |
|---|---|---|---|
| CN | 103806128 | A | 5/2014 |
| CN | 106183142 | A | 12/2016 |
| CN | 110117839 | A | 8/2019 |
| CN | 111676591 | A | 9/2020 |

OTHER PUBLICATIONS

Written Opinion of the International Searching Authority Dated Jul. 29, 2022 for corresponding PCT Application No. PCT/CN2021/137642 along its English Translation.

* cited by examiner

US 12,435,447 B2

AEROGEL FIBER HAVING SPECIFIC CROSS-SECTIONAL MORPHOLOGICAL FEATURE, GRAPHENE FIBER AND PREPARATION METHOD AND DEVICE THEREFOR

CROSS-REFERENCE TO RELATED APPLICATIONS

The present application is a Continuation Application of PCT Application No. PCT/CN2021/137642, filed on Dec. 14, 2021, the entire contents of which are hereby incorporated by reference.

TECHNICAL FIELD

The present disclosure relates to the field of nanomaterials, in particular to aerogel fibers having specific cross-sectional morphological feature, graphene fibers and preparation methods and devices therefor.

DESCRIPTION OF THE PRIOR ART

Aerogel fiber is a new material that combines the excellent properties of aerogel and fiber, which is a fiber obtained by subjecting gel fiber prepared by wet spinning to freeze drying or ambient pressure drying or the like, with lightweight, high specific surface area and high porosity. Two-dimensional sheet-like molecules are monolayer molecules with a large width-thickness ratio. Taking graphene as an example, it has extremely high tensile strength, Young's modulus, high conductivity, and the highest thermal conductivity at room temperature. In addition to typical properties such as high porosity, aerogel fibers prepared with two-dimensional sheet-like molecules as assembly units also have excellent mechanical-electrical-thermal properties.

However, the existing researches on aerogel fibers assembled with two-dimensional nanosheets are mainly focused on the preparation methods therefor. There is no method to regulate the internal structure of aerogel fibers in the prior art. Especially, two-dimensional nanosheets have two-dimensional anisotropy in space, which are not only axially oriented in the fibers, but also randomly oriented in the circumferential cross-sectional direction of the fibers. The random arrangement of the two-dimensional nanosheets in the circumferential cross-sectional direction of the aerogel fiber will inevitably lead to a decrease in the compression resistance of the aerogel fibers, affecting the applications of the aerogel fibers in practice. Further, the unregulated cross-sectional arrangement will also affect the effective transfer of electrons and phonons between the two-dimensional nanosheets with high electrical conductivity and high thermal conductivity, affecting the conductive properties of the aerogel fibers. Therefore, the method for effectively and precisely regulating the arrangement of the two-dimensional nanosheets in aerogel fibers becomes a research hotspot. By precisely regulating the arrangement of two-dimensional nanosheets in the aerogel fibers, aerogel fibers having specific cross-sectional morphological features can be prepared, thereby promoting the practical applications of aerogel fibers.

In 2011, the Gao Chao Research Group of Zhejiang University invented a macroscopic graphene fiber with monolayer graphene as the assembly unit, creating a new way to prepare carbon fibers using natural graphite as raw material. At present, pure graphene fiber shows excellent performances in terms of thermal conductivity, which is much higher than that of traditional carbon fibers. However, the mechanical properties of graphene fiber are poor, although the mechanical strength of its monofilament can reach 3.4 GPa, its modulus has not yet exceeded 400 GPa, which is inconsistent with the law of simultaneous improvement of modulus and thermal conductivity in traditional carbon fibers. In other words, the thermal conductivity of graphene fiber far exceeds that of traditional carbon fibers, but its modulus is lower than that of traditional carbon fibers.

High thermal conductivity and high modulus are two key indicators that can be improved simultaneously in traditional carbon fibers, which are usually closely related to the orientation and density of the fiber. At present, the orientation degree of graphene fiber can reach more than 90%. However, graphene fibers are obtained by directly assembling monolayer graphenes. Graphene has a typical two-dimensional macromolecular structure, and its arrangement determines the density of the graphene fiber. Therefore, improving the arrangement of the two-dimensional graphene sheets in the graphene fiber will improve the density and crystallinity of the graphene fiber, in order to prepare a graphene fiber with high modulus and high thermal conductivity.

SUMMARY OF THE DISCLOSURE

In order to overcome the above-mentioned existing technical shortcomings, the present disclosure provides an aerogel fiber having specific cross-sectional morphological feature and its preparation method and device, and provides a graphene fiber with high modulus and high thermal conductivity.

In the present disclosure, based on the unique large width-thickness ratio of two-dimensional planar nanosheets, a good lyotropic liquid crystal phenomenon is occurred. Based on the unique macromolecules of two-dimensional planar nanosheets, the dynamic stability of liquid crystals is good. After the liquid crystal spinning solution of two-dimensional planar nanosheets passes through the rotating flow field, a hydrogel fiber with specific structure is formed. After freeze-drying of such gel fiber, an aerogel fiber having specific cross-sectional morphology is obtained. After drying and densifying the hydrogel fiber, an as-formed graphene oxide fiber can be obtained. The as-formed graphene oxide fiber can be plasticized, stretched, chemically reduced and heat treated to obtain graphene fiber with high modulus and high thermal conductivity.

In one aspect, the present disclosure discloses an aerogel fiber having specific cross-sectional morphological feature, which is consisted of two-dimensional nanosheets, and has a cross section in a concentric sheet-like arrangement or a radially spiral sheet-like arrangement.

The preparation method of the above-mentioned aerogel fiber includes: extruding a dispersion of two-dimensional nanosheets into a coagulation bath with an extrusion speed including an axial speed along an extrusion direction and a circumferential rotation speed perpendicular to the axial speed, and performing structural fixation after coagulation to obtain the aerogel fiber having specific cross-sectional morphological feature.

Further, the method includes introducing a circumferential rotational shear force into the dispersion of two-dimensional nanosheets to provide the circumferential rotation speed.

Further, the two-dimensional nanosheets are one or more nanosheets with two-dimensional anisotropy selected from a group consisting of graphene oxide, graphene, Mxene, molybdenum disulfide and montmorillonite.

Further, the dispersion of two-dimensional nanosheets has a concentration greater than 1 mg/g.

The present disclosure further discloses a device for preparing an aerogel fiber having specific cross-sectional morphological feature, which at least includes an extrusion device, a coagulation bath and a freeze-drying system; wherein the extrusion device includes a spinning tube which has a circumferential rotational shear force therein.

Further, the spinning tube has a rotor therein, and the rotor is located at an axis of the spinning tube.

Further, the rotor in the spinning tube rotates about its axis.

In another aspect, the present disclosure further discloses a graphene fiber with high modulus and high thermal conductivity, which is consisted of two-dimensional graphene nanosheets, and has a cross section in a concentric sheet-like arrangement, wherein the two-dimensional graphene nanosheets are axially oriented and constitute multiple graphite crystals with an axial length above 200 nm and a radial length above 100 nm; and the graphene fiber has a density greater than or equal to 1.9 g/cm$^3$.

The present disclosure further discloses a method for preparing the above-mentioned graphene fiber, including extruding a dispersion of two-dimensional graphene oxide nanosheets into a coagulation bath with an extrusion speed including an axial speed along an extrusion direction and a circumferential rotation speed perpendicular to the axial speed and drying to obtain an as-formed graphene oxide fiber; and performing plasticizing and stretching, chemical reduction and heat treatment to obtain the graphene fiber with high modulus and high thermal conductivity.

Further, the method includes introducing a circumferential rotational shear force into the dispersion of two-dimensional nanosheets to provide the circumferential rotation speed.

Further, the dispersion of two-dimensional graphene oxide nanosheets is an aqueous-phase dispersion, a DMF-phase dispersion, a DMAc-phase dispersion, or a DMSO-phase dispersion of graphene oxide, and the coagulation bath is one or more coagulation baths selected from a group consisting of ethyl acetate, methylene chloride, acetic acid, ethanol, isopropyl alcohol, chloroform and acetone, or a coagulation bath of an aqueous solution of high-valent salt which is calcium chloride, ferrous chloride or ferric sulfate.

Further, the plasticizing and stretching includes immersing the fiber in a plasticizer for stretching, and wherein the plasticizer is one or more selected from a group consisting of glycerol, propylene glycol, ethylene glycol, triethylene glycol, acetone, isopropyl alcohol, acetic acid, methanol, tetraethylene glycol, pentaethylene glycol, hydrochloric acid, diluted sulfuric acid and organic amine.

Further, the chemical reduction uses a reagent selected from hydroiodic acid, hydrazine hydrate, sodium ascorbate and stannous chloride, and the heat treatment adopts a temperature in a range of 1300 to 3000° C.

At last, the present disclosure further provides use of the above fibers in sensing, phase change energy storage, and catalytic energy.

The beneficial effects of the present disclosure include:

1) By precisely regulating the arrangement of the two-dimensional nanosheets in the aerogel fiber, the aerogel fiber has specific cross-sectional morphological features, solving the problem that the sheet arrangement of the two-dimensional nanosheets in the aerogel fiber cannot be precisely regulated, improving the mechanical property and conductive property of the aerogel fiber and promoting the practical applications of the aerogel fiber.

2) By constructing the graphene fiber with a specific structure, the present disclosure improves the orderliness of the arrangement of graphene sheets in the fiber, thereby increasing the density of the resulted heat-treated graphene fiber and significantly improving the crystallinity of graphene during the heat treatment process. The crystal size is significantly increased, and the thermal conductivity and modulus of the graphene fiber are greatly improved.

DESCRIPTION OF EMBODIMENTS

Comparative Example 1

(1) An aqueous graphene oxide liquid crystal spinning solution with a concentration of 6 mg/g is extruded into a circular spinning tube with a diameter of 500 μm at a speed of 0.2 mL/min. When being extruded into the spinning tube, the liquid crystal spinning solution passes through a device rotating a rotor, and the rotor speed is 0 rpm, so that the graphene oxide liquid crystal spinning solution has not experienced the shearing effect of a rotating rotor;

(2) Then the graphene oxide liquid crystal spinning solution is further extruded into a coagulation bath of calcium chloride aqueous solution with a concentration of 3 wt %, to obtain a graphene oxide gel fiber after coagulation. The gel fiber is soaked in deionized water three times to clean away excess free calcium ions;

(3) The graphene oxide gel fiber is frozen in a refrigerator at −80° C. for one hour, and then put into a freeze dryer for freeze-drying to obtain a graphene oxide aerogel fiber after drying.

Figure 4A:
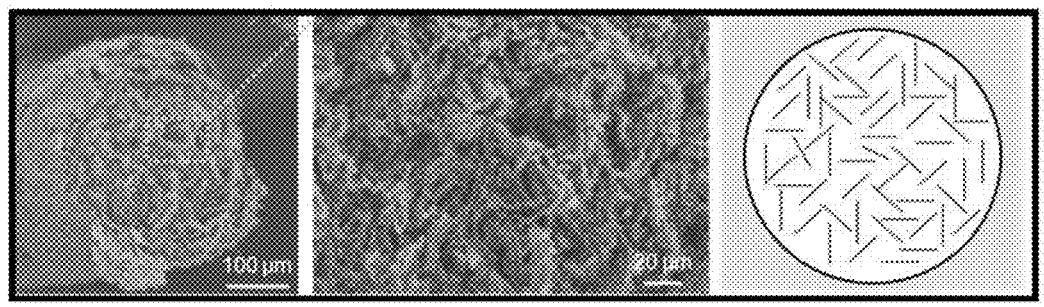
FIG. 4*a* shows the cross-sectional morphology of a graphene oxide aerogel fiber with a random cross-sectional structure.

The cross-sectional morphology of the prepared graphene oxide aerogel fiber is shown in FIG. 4*a*.

Example 1

(1) An aqueous graphene oxide liquid crystal spinning solution with a concentration of 6 mg/g is extruded into a circular spinning tube with a diameter of 500 μm at a speed of 0.2 mL/min. When being extruded into the spinning tube, the liquid crystal spinning solution passes through a device rotating a rotor, and the rotor speed is 100 rpm, so that the graphene oxide liquid crystal spinning solution forms a concentric circle arrangement through the shearing effect of the rotating rotor;

(2) Then the graphene oxide liquid crystal spinning solution with a concentric circle arrangement is further extruded into a coagulation bath of calcium chloride aqueous solution with a concentration of 3 wt %, to obtain a graphene oxide gel fiber after coagulation. The gel fiber is soaked in deionized water three times to clean away excess free calcium ions;

(3) The graphene oxide gel fiber is frozen in a refrigerator at −80° C. for one hour, and then put into a freeze dryer for freeze-drying to obtain a graphene oxide aerogel fiber after drying.

Figure 4B:
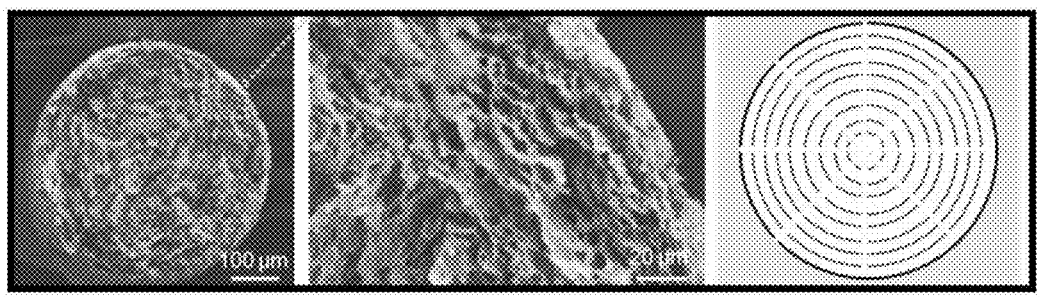
FIG. 4*b* shows the cross-sectional morphology of a graphene oxide aerogel fiber with a concentric cross-sectional structure.

The cross-sectional morphology of the prepared graphene oxide aerogel fiber is shown in FIG. 4b. As the graphene oxide is a macromolecule and the liquid crystal has good dynamic stability, its specific structure can be maintained after passing through the rotating flow field. The final arrangement of graphene macromolecules after passing through the rotating flow field can be kept to the graphene oxide aerogel fiber and corresponding graphene aerogel fiber.

Figure 3:
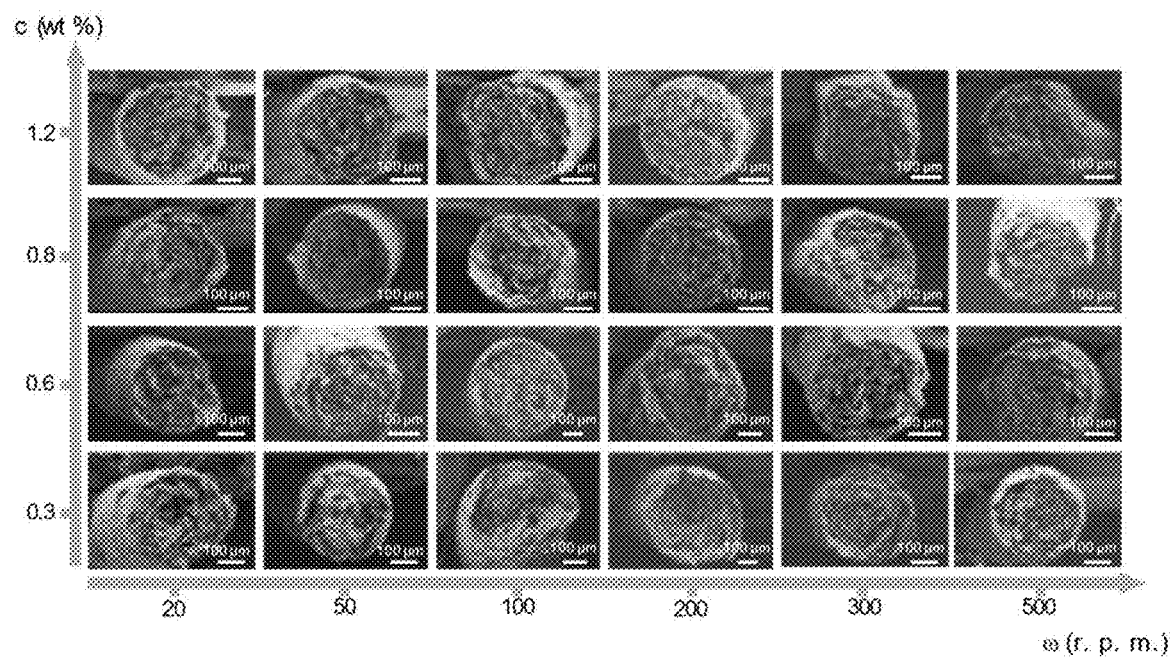
FIG. 3 shows the cross-sectional morphology of graphene oxide aerogel fibers prepared under different graphene liquid crystal spinning solution concentrations and different rotor speeds.

On the basis of Example 1, the concentration of graphene oxide and the rotor speed are adjusted. The results are shown in FIG. 3. The cross-sectional morphology of the aerogel fiber is mainly determined by the concentration of the graphene oxide liquid crystal spinning solution and the rotor speed. The concentration of graphene oxide solution determines whether liquid crystal can be formed. As common knowledge in the field, liquid crystal can be formed when the concentration of graphene oxide solution is above 0.1 wt %. Under a fixed concentration, as the rotor speed increases, the cross-section of the graphene oxide aerogel fiber first assumes a concentric circle structure, and then assumes a spiral structure when the rotation speed is further increased. It is common knowledge in the art to control the concentration of graphene oxide to form liquid crystals. Those skilled in the art can control the cross-sectional morphology of the gel fiber according to the above-mentioned rotation speed regularity.

Example 2

(1) An aqueous graphene oxide liquid crystal spinning solution with a concentration of 6 mg/g is extruded into a circular spinning tube with a diameter of 500 μm at a speed of 0.2 mL/min. When being extruded into the spinning tube, the liquid crystal spinning solution passes through a device rotating a rotor, and the rotor speed is 500 rpm, so that the graphene oxide liquid crystal spinning solution forms a spiral arrangement through the shearing effect of the rotating rotor;

(2) Then the graphene oxide liquid crystal spinning solution with a spiral arrangement is further extruded into a coagulation bath of calcium chloride aqueous solution with a concentration of 3 wt %, to obtain a graphene oxide gel fiber after coagulation. The gel fiber is soaked in deionized water three times to clean away excess free calcium ions;

(3) The graphene oxide gel fiber is frozen in a refrigerator at −80° C. for one hour, and then put into a freeze dryer for freeze-drying to obtain a graphene oxide aerogel fiber after drying.

Figure 4C:
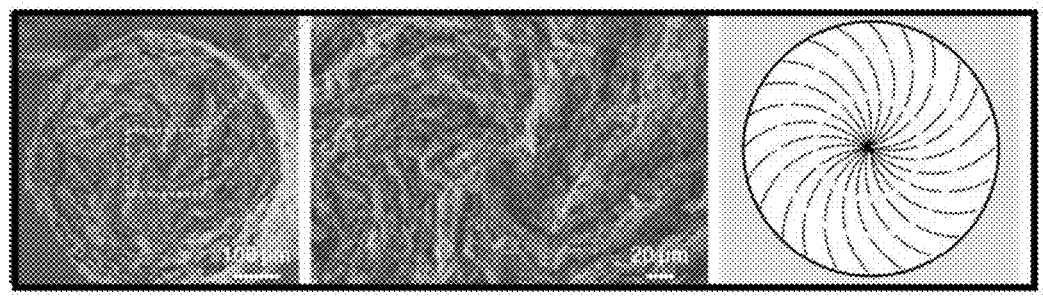
FIG. 4*c* shows the cross-sectional morphology of a graphene oxide aerogel fiber with a spiral cross-sectional structure.

The cross-sectional morphology of the prepared graphene oxide aerogel fiber is shown in FIG. 4c.

Example 3

(1) An aqueous graphene oxide liquid crystal spinning solution with a concentration of 8 mg/g is extruded into a circular spinning tube with a diameter of 300 μm at a speed of 0.2 mL/min. When being extruded into the spinning tube, the liquid crystal spinning solution passes through a device rotating a rotor, and the rotor speed is 50 rpm, so that the graphene oxide liquid crystal spinning solution forms a concentric circle arrangement through the shearing effect of the rotating rotor;

(2) Then the graphene oxide liquid crystal spinning solution with a concentric circle arrangement is further extruded into a coagulation bath of ferrous chloride aqueous solution with a concentration of 3 wt %, to obtain a graphene oxide gel fiber after coagulation. The gel fiber is soaked in deionized water three times to clean away excess free ferrous ions;

(3) The cleaned graphene oxide gel fiber is soaked in 1% sodium ascorbate aqueous solution, heated to 80° C., and reduced for 12 hours to obtain a chemically reduced graphene gel fiber, which is cleaned by deionized water;

(4) The prepared graphene gel fiber is frozen in a liquid nitrogen environment at −120° C. for one hour, and then put into a freeze dryer for freeze-drying to obtain a graphene aerogel fiber after drying.

(5) The dried graphene aerogel fiber with a concentric circle arrangement is subjected to heat treatment at 2800° C. in an argon environment to obtain a pure graphene aerogel fiber.

After testing, the resulted heat-treated graphene aerogel fiber has high thermal conductivity up to 15 W/(mK). By contrast, the thermal conductivity of random graphene aerogel fibers is less than 10 W/(mK). The graphene aerogel fiber with high thermal conductivity can be applied to thermal-, electrical-, or light-responsive functional materials.

Example 4

(1) An Mxene spinning solution with a concentration of 6 mg/g is extruded into a circular spinning tube with a diameter of 500 μm at a speed of 0.2 mL/min. When being extruded into the spinning tube, the spinning solution passes through a device rotating a rotor, and the rotor speed is 200 rpm, so that the spinning solution forms a concentric circle arrangement through the shearing effect of the rotating rotor;

(2) Then the Mxene spinning solution with a concentric circle arrangement is further extruded into a coagulation bath of ammonium chloride aqueous solution with a concentration of 6 wt %, to obtain an Mxene gel fiber after coagulation. The gel fiber is soaked in deionized water three times to clean away the excess free ions;

(3) The Mxene gel fiber is frozen in a refrigerator at −80° C. for one hour, and then put into a freeze dryer for freeze-drying to obtain an Mxene aerogel fiber after drying.

Example 5

(1) An aqueous graphene oxide liquid crystal spinning solution with a concentration of 6 mg/g is extruded into a circular spinning tube with a diameter of 500 μm at a speed of 0.2 mL/min. When being extruded into the spinning tube, the liquid crystal spinning solution is rotated by the spinning tube which is rotated under external mechanical action, in such a way that the two-dimensional graphene oxide nanosheets form a concentric circle arrangement under the circumferential rotational shearing effect;

(2) Then the graphene oxide liquid crystal spinning solution with a concentric circle arrangement is further extruded into a coagulation bath of calcium chloride aqueous solution with a concentration of 3 wt %, to obtain a graphene oxide gel fiber after coagulation. The gel fiber is soaked in deionized water three times to clean away excess free calcium ions;

(3) The graphene oxide gel fiber is frozen in a refrigerator at −80° C. for one hour, and then put into a freeze dryer for freeze-drying to obtain a graphene oxide aerogel fiber after drying.

Example 6

(1) A spinning solution of graphene oxide and montmorillonite with a concentration of 10 mg/g is extruded into a circular spinning tube with a diameter of 500 μm at a speed of 0.2 mL/min. When being extruded into the spinning tube, the spinning solution passes through a device rotating a rotor, and the rotor speed is 400 rpm, so that the spinning solution forms a spiral arrangement through the shearing effect of the rotating rotor;

(2) Then the spinning solution with a spiral arrangement is further extruded into a coagulation bath of calcium chloride aqueous solution with a concentration of 4 wt %, to obtain a mixed gel fiber of graphene oxide and montmorillonite after coagulation. The gel fiber is soaked in deionized water three times to clean away excess free ions;

(3) The mixed gel fiber of graphene oxide and montmorillonite is frozen in a liquid nitrogen environment for one hour, and then put into a freeze dryer for freeze-drying to obtain a mixed aerogel fiber of graphene oxide and montmorillonite after drying.

Example 7

Figure 1:
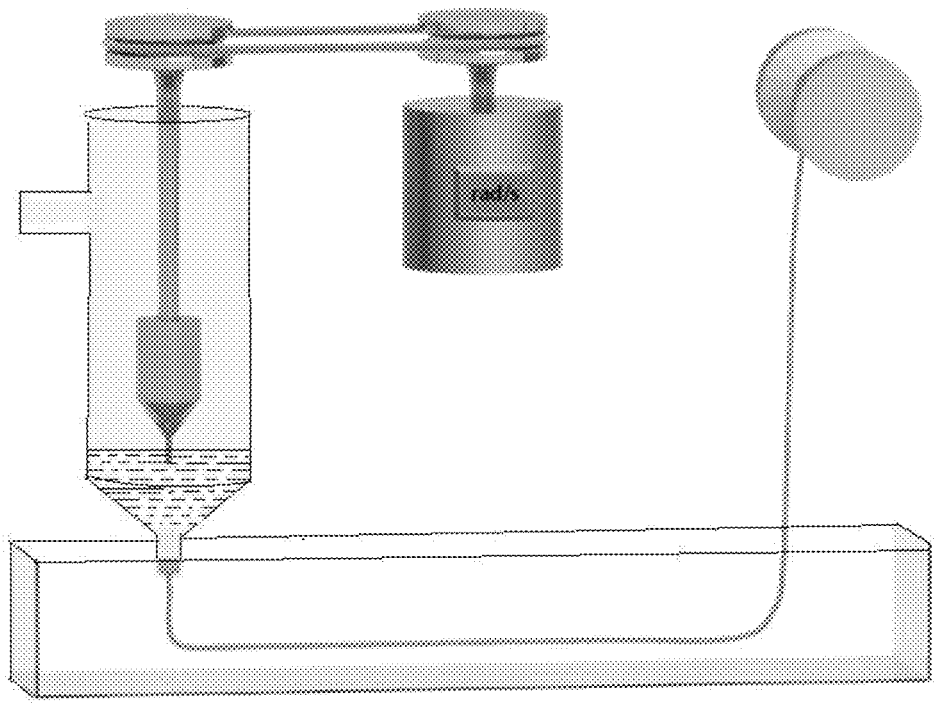
FIG. 1 is a schematic view of a self-made rotation-extrusion-spinning device.
Figure 2:
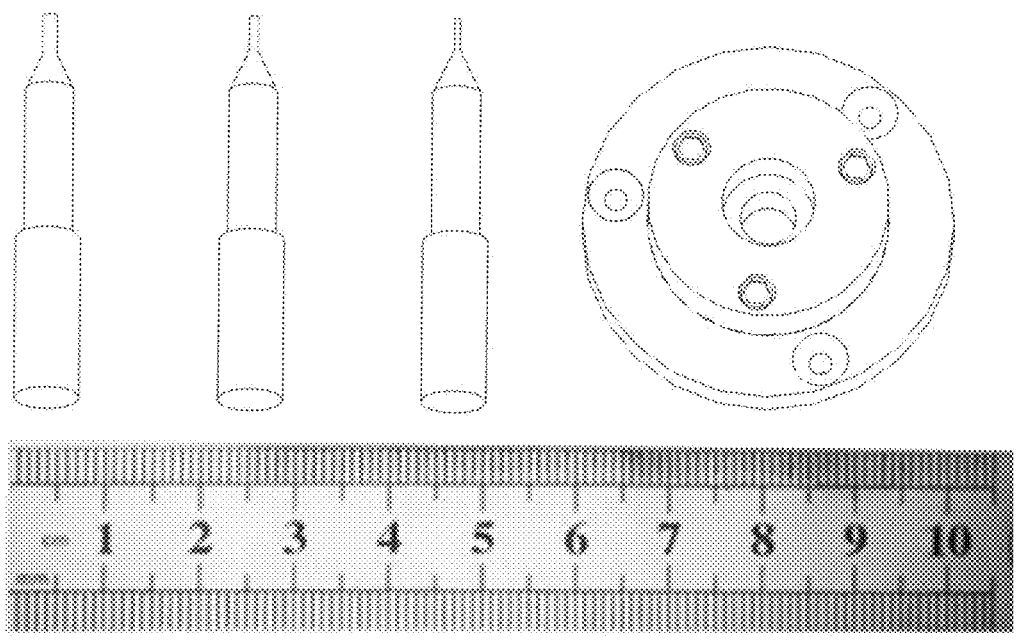
FIG. 2 shows the rotor in the rotation-extrusion-spinning device.

(1) A DMF-phase graphene oxide liquid crystal spinning solution with a concentration of 6 mg/g is extruded into a circular spinning tube with a diameter of 100 μm at a speed of 0.2 mL/min. Before being extruded into the spinning tube, the liquid crystal spinning solution passes through a device rotating a rotor, and the rotor speed is 100 rpm, so that the graphene oxide liquid crystal is driven by the rotating rotor into a concentric circle structure, as shown in FIG. 2;

(2) Then the graphene oxide liquid crystal spinning solution with a concentric circle structure is further extruded into a coagulation bath of ethyl acetate, to obtain an as-formed graphene oxide fiber after drying;

(3) The as-formed graphene oxide fiber is soaked into acetic acid for plasticization, and the plasticized graphene oxide fiber is stretched with a stretching rate of 30%, and then dried while maintaining the current length;

(4) The dried graphene oxide fiber is subjected to chemical reduction with hydriodic acid and heat treatment at 2700° ° C. to obtain a graphene fiber with high modulus and high thermal conductivity.

Figure 5:
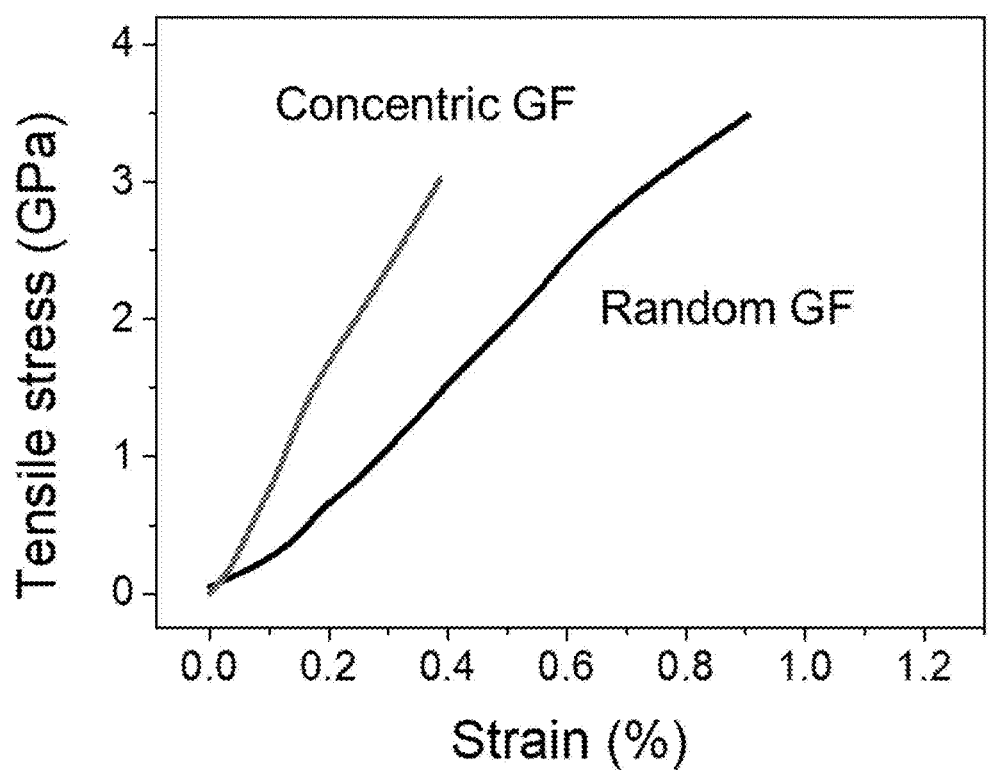
FIG. 5 shows the mechanical curves of graphene fibers, wherein the Concentric GF curve refers to the graphene fiber formed by coagulation, drying and heat treatment of concentric gel fiber; and the Random GF curve refers to the graphene fiber formed by coagulation, drying and heat treatment of random gel fiber.

After mechanical testing, the graphene fiber prepared from the gel fiber with a concentric circle structure has a strength of 3 GPa, a modulus of 833 GPa, and a thermal conductivity of 1590 W/(mK). The mechanical curve is shown in FIG. 5 depicted as Concentric GF.

Comparative Example 2

This comparative example is similar to Example 7, except that a spinning tube without a rotor is used for extrusion.

(1) A DMF-phase graphene oxide liquid crystal spinning solution with a concentration of 6 mg/g is extruded into a circular spinning tube with a flow channel diameter of 100 μm at a speed of 0.2 mL/min. There is no rotor in the spinning tube, so the graphene oxide liquid crystal is not driven by a rotating flow field into a concentric circle structure, which is in a typical unregulated random state;

(2) Then the random graphene oxide liquid crystal spinning solution is further extruded into a coagulation bath of ethyl acetate, to obtain an as-formed graphene oxide fiber after drying;

(3) The as-formed graphene oxide fiber is soaked into acetic acid for plasticization, and the plasticized graphene oxide fiber is stretched with a stretching rate of 30%, and then dried while maintaining the current length;

(4) The dried graphene oxide fiber is subjected to chemical reduction with hydriodic acid and heat treatment at 2700° C. to obtain a graphene fiber prepared from the random gel fiber.

After mechanical testing, the graphene fiber without microfibrillation has a strength of 3.1 GPa, a modulus of 343 GPa, and a thermal conductivity of 1400 W/(mK). The mechanical curve is shown in FIG. 5 depicted as Random GF.

Example 8

(1) A DMF-phase graphene oxide liquid crystal spinning solution with a concentration of 8 mg/g is extruded into a circular spinning tube with a diameter of 100 μm at a speed of 0.2 mL/min. Before being extruded into the spinning tube, the liquid crystal spinning solution passes through a device rotating a rotor, and the rotor speed is 50 rpm, so that the graphene oxide liquid crystal is driven by the rotating rotor into a concentric circle structure;

(2) Then the graphene oxide liquid crystal spinning solution with a concentric circle structure is further extruded into a coagulation bath of ethyl acetate, to obtain an as-formed graphene oxide fiber after drying;

(3) The as-formed graphene oxide fiber is soaked into ethanol for plasticization, and the plasticized graphene oxide fiber is stretched with a stretching rate of 10%, and then dried while maintaining the current length;

(4) The dried graphene oxide fiber is subjected to chemical reduction with hydriodic acid and heat treatment at 2700° C. to obtain the graphene fiber.

After mechanical testing, the graphene fiber prepared under the above conditions has a strength of 2 GPa, a modulus of 650 GPa, and a thermal conductivity of 1490 W/(mK).

Example 9

This comparative example is similar to Example 8, except that the rotor speed is 500 rpm, and a spiral structure is formed.

(1) A DMF-phase graphene oxide liquid crystal spinning solution with a concentration of 8 mg/g is extruded into a circular spinning tube with a diameter of 100 μm at a speed of 0.2 mL/min. Before being extruded into the spinning tube, the liquid crystal spinning solution passes through a device rotating a rotor, and the rotor speed is 500 rpm, so that the graphene oxide liquid crystal is driven by the rotating rotor into a spiral structure;

(2) Then the graphene oxide liquid crystal spinning solution with a spiral structure is further extruded into a coagulation bath of ethyl acetate, to obtain an as-formed graphene oxide fiber after drying;

(3) The as-formed graphene oxide fiber is soaked into ethanol for plasticization, and the plasticized graphene oxide fiber is stretched with a stretching rate of 10%, and then dried while maintaining the current length;

(4) The dried graphene oxide fiber is subjected to chemical reduction with hydriodic acid and heat treatment at 2700° C. to obtain the graphene fiber.

After mechanical testing, the graphene fiber prepared under the above conditions has a strength of 1.8 GPa, a modulus of 500 GPa, and a thermal conductivity of 1360 W/(mK).

The invention claimed is:

1. A method for preparing the aerogel fiber having specific cross-sectional morphological feature, which is consisted of two-dimensional nanosheets, and has a cross section in a concentric sheet arrangement or a radially spiral sheet arrangement, the method comprising:

extruding a dispersion of two-dimensional nanosheets into a circular spinning tube with an axial speed along an extrusion direction and passing the dispersion through a rotating rotor with a rotation speed perpendicular to the axial speed to cause the dispersion to form a concentric circle arrangement or a spiral arrangement;

extruding the dispersion with a concentric circle arrangement or a spiral arrangement into a coagulation bath to obtain a gel fiber; and performing structural fixation after coagulation to obtain the aerogel fiber having specific cross-sectional morphological feature.

2. An aerogel fiber prepared by a method according to claim 1.

3. The method according to claim 1, wherein the rotor introduces a circumferential rotational shear force into the dispersion of two-dimensional nanosheets.

4. The method according to claim 1, wherein the two-dimensional nanosheets are one or more nanosheets with two-dimensional anisotropy selected from a group consisting of graphene oxide, graphene, Mxene, molybdenum disulfide and montmorillonite.

5. The method according to claim 1, wherein the dispersion of two-dimensional nanosheets has a concentration greater than 1 mg/g.

6. A device for preparing an aerogel fiber according to claim 2, the device at least comprising an extrusion device, a coagulation bath and a freeze-drying system; wherein the extrusion device comprises a spinning tube which has a circumferential rotational shear force therein.

7. The device according to claim 6, wherein the spinning tube has a rotor therein, and the rotor is located at an axis of the spinning tube.

8. The device according to claim 6, wherein the rotor in the spinning tube rotates about its axis.

9. The method according to claim 1, wherein the rotor is located at an axis of the spinning tube.

10. The method according to claim 1, wherein the rotor in the spinning tube rotates about its axis.

11. The method according to claim 1, wherein the coagulation bath is one or more coagulation baths selected from a group consisting of ethyl acetate, methylene chloride, acetic acid, ethanol, isopropyl alcohol, chloroform and acetone, or a coagulation bath of an aqueous solution of high-valent salt which is calcium chloride, ferrous chloride or ferric sulfate.

12. The method according to claim 1, wherein the axial speed is 0.2 mL/min.

13. The method according to claim 1, wherein the step of performing structural fixation comprising freeze-drying the gel fiber to obtain the aerogel fiber having specific cross-sectional morphological feature.

14. The method according to claim 13, wherein the freeze-drying temperature is −80° C. or −120° C., and the freeze-drying time is 1 hour.

* * * * *